(12) United States Patent
Dragoo et al.

(10) Patent No.: US 11,769,927 B2
(45) Date of Patent: Sep. 26, 2023

(54) BATTERY HOUSING

(71) Applicant: EXMARK MANUFACTURING COMPANY INCORPORATED, Beatrice, NE (US)

(72) Inventors: Derek L. Dragoo, Clatonia, NE (US); Michael Shane Fredenburg, Hickman, NE (US); Patrick D. Sands, Firth, NE (US)

(73) Assignee: EXMARK MANUFACTURING COMPANY INCORPORATED, Beatrice, NE (US)

( * ) Notice: Subject to any disclaimer, the term of this patent is extended or adjusted under 35 U.S.C. 154(b) by 90 days.

(21) Appl. No.: 17/554,661

(22) Filed: Dec. 17, 2021

(65) Prior Publication Data

US 2022/0209355 A1 Jun. 30, 2022

Related U.S. Application Data

(60) Provisional application No. 63/132,231, filed on Dec. 30, 2020.

(51) Int. Cl.
| | |
|---|---|
| *H01M 50/271* | (2021.01) |
| *H01M 50/289* | (2021.01) |
| *H01M 50/298* | (2021.01) |
| *H01M 50/249* | (2021.01) |
| *H01M 50/242* | (2021.01) |
| *H01M 50/264* | (2021.01) |

(52) U.S. Cl.
CPC ....... *H01M 50/271* (2021.01); *H01M 50/242* (2021.01); *H01M 50/249* (2021.01); *H01M 50/264* (2021.01); *H01M 50/289* (2021.01); *H01M 50/298* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 3,584,135 A * | 6/1971 | Dowtin | H01M 50/204 220/378 |
| 4,535,863 A | 8/1985 | Becker | |
| 5,547,036 A | 8/1996 | Gawaskar et al. | |
| 5,725,065 A | 3/1998 | Knur et al. | |

(Continued)

*Primary Examiner* — Gregg Cantelmo
(74) *Attorney, Agent, or Firm* — Mueting Raasch Group (57) ABSTRACT

The technology disclosed herein relates to a battery housing having a casing with a plurality of sidewalls defining an installation opening and a battery cavity configured to receive a battery. The plurality of sidewalls has a first sidewall having a tab receptacle. A cover extends across the installation opening, the cover has a first end, a second end, and an engagement tab towards the second end. The engagement tab is configured to removably extend through the tab receptacle from outside the casing towards the battery cavity. The engagement tab defines an engagement surface that is configured to frictionally engage the first sidewall in the battery cavity. An adjustable compression mechanism couples the first end of the cover to the casing and defines an axial distance between the casing and the cover. The adjustable compression mechanism is configured to adjustably compress the cover and the casing together across the axial distance.

20 Claims, 7 Drawing Sheets

(56) References Cited

U.S. PATENT DOCUMENTS

| | | |
|---|---|---|
| D602,862 S | 10/2009 | Reed et al. |
| 8,037,669 B2 | 10/2011 | Hansen et al. |
| 8,778,527 B2 | 7/2014 | Lee |
| D720,780 S | 1/2015 | Chlystek et al. |
| D777,216 S | 1/2017 | Allemeier et al. |
| D821,449 S | 6/2018 | Atterbury et al. |
| 10,249,855 B2 | 4/2019 | Burdy et al. |
| D878,294 S | 3/2020 | Christensen et al. |
| D936,585 S | 11/2021 | Fredenburg et al. |
| 2011/0088362 A1* | 4/2011 | Rosa .................. B60L 50/52 56/11.9 |
| 2013/0037366 A1* | 2/2013 | Fiorentin ............ B60M 1/36 191/13 |

\* cited by examiner

BATTERY HOUSING

This application claims the benefit of U.S. Provisional Application No. 63/132,231, filed 30 Dec. 2020, the disclosure of which is incorporated by reference herein in its entirety.

TECHNOLOGICAL FIELD

The present disclosure is generally related to a battery housing. More particularly, the present disclosure is related to a battery housing for a vehicle.

SUMMARY

The technology disclosed herein relates to a battery housing. The battery housing has a casing having a plurality of sidewalls. The plurality of sidewalls define an installation opening and a battery cavity configured to receive a battery. The plurality of sidewalls includes a first sidewall having a tab receptacle extending therethrough. A cover extends across the installation opening. The cover has a first end, a second end, and an engagement tab towards the second end. The engagement tab is configured to removably extend through the tab receptacle from outside the casing towards the battery cavity. The engagement tab defines an engagement surface that is configured to frictionally engage the first sidewall in the battery cavity. An adjustable compression mechanism couples the first end of the cover to the casing. The adjustable compression mechanism defines an axial distance between the casing and the cover and is configured to adjustably compress the cover and the casing together across the axial distance.

In some such embodiments, the first end forms a top cover portion of the battery housing. Additionally or alternatively, the cover further forms side cover portion extending from the top cover portion to the engagement tab. Additionally or alternatively, the side cover portion and the top cover portion form an angle of at least 45°. Additionally or alternatively, the cover is separable from the plurality of sidewalls. Additionally or alternatively, the cover further comprising a battery compression surface between the first end and the second end, wherein the battery compression surface is configured to apply downward pressure to a battery disposed in the battery cavity. Additionally or alternatively, the adjustable compression mechanism has a bolt having a first bolt end fixed to the casing and the first end of the cover is axially translatable along the bolt.

Additionally or alternatively, the adjustable compression mechanism further comprises a knob coupled to a second bolt end of the bolt configured for manual rotation by a user. Additionally or alternatively, the cover defines a bolt receiving slot extending from a distal end of the first end of the cover towards the second end of the cover. Additionally or alternatively, the engagement tab has an extension portion defining a tab plane is between 0° and 90° to a sidewall plane defined by the first sidewall. Additionally or alternatively, the cover has a plurality of engagement tabs defining the engagement surface and the first sidewall defines a plurality of tab receptacles, and each engagement tab of the plurality of engagement tabs is removably disposed in a tab receptacle. Additionally or alternatively, the casing has a wiring conduit extending outward from the battery cavity.

Additionally or alternatively, a first restraint flange extends inward from a sidewall, wherein the first restraint flange separates the battery cavity from the wiring conduit. Additionally or alternatively, a second restraint flange extends inward from a sidewall, wherein the second restraint flange separates the battery cavity from the first sidewall. Additionally or alternatively, the plurality of sidewalls has a battery platform, where the second restraint flange extends upward from the battery platform and towards the first sidewall. Additionally or alternatively, the plurality of sidewalls has a battery platform, where the battery platform defines an access opening to a bottom surface of a battery received by the battery platform.

Some embodiments relate to a method of installing a battery in a battery housing. A battery is inserted through an installation opening in a casing into a battery cavity. An engagement tab of a cover is inserted into a tab receptacle of the casing, where the engagement tab is defined towards a second end of the cover. The cover is extended over the battery and the installation opening. A first end of the cover is coupled to an adjustable compression mechanism fixed to the casing. The adjustable compression mechanism is tightened to translate the first end of the cover axially towards the casing.

In some such embodiments, the adjustable compression mechanism includes a bolt, and coupling the first end of the cover to the adjustable compression mechanism includes sliding the first end of the cover past the bolt to translate the bolt along a slot defined by the first end of the cover. Additionally or alternatively, tightening the adjustable compression mechanism results in the cover applying compression force to the battery. Additionally or alternatively, tightening the adjustable compression mechanism includes rotating a manually rotatable knob.

The above summary is not intended to describe each embodiment or every implementation. Rather, a more complete understanding of illustrative embodiments will become apparent and appreciated by reference to the following Detailed Description and claims in view of the accompanying figures of the drawing.

BRIEF DESCRIPTION OF THE DRAWINGS

The present technology may be more completely understood and appreciated in consideration of the following detailed description of various embodiments in connection with the accompanying drawings.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION

Figure 1:
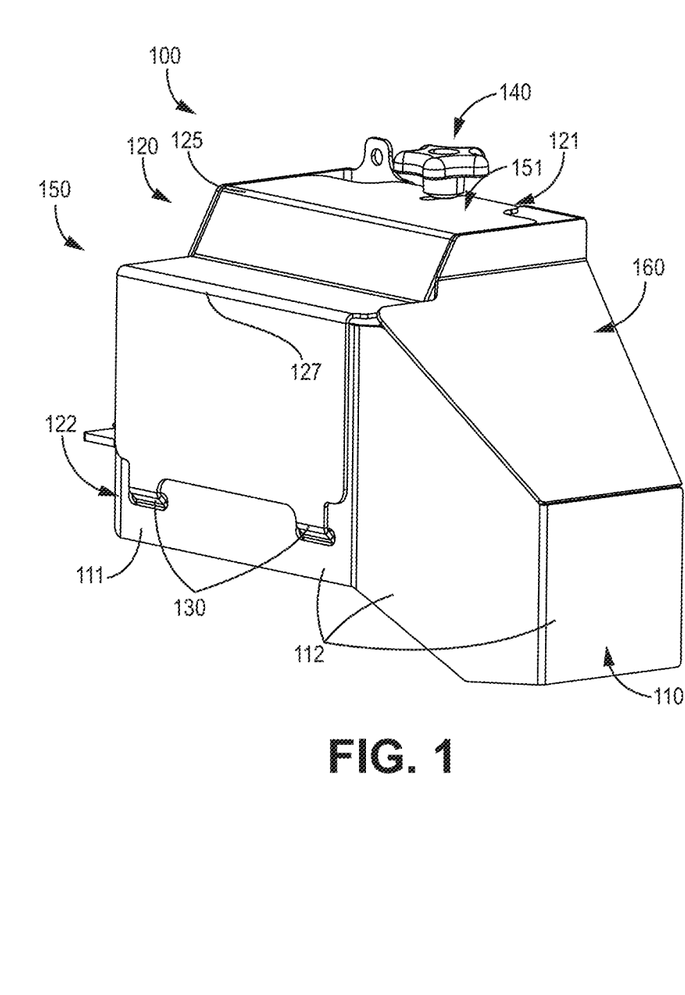
FIG. 1 is a perspective view of an example battery housing consistent with an example.

FIG. 1 is a perspective view of an example battery housing 100 consistent with some embodiments. The battery housing 100 is generally configured to house a battery. In various implementations, the battery housing 100 is configured to house a vehicle battery. The battery housing 100 generally has a casing 110 and a cover 120. The casing 110 and the cover 120 are generally configured to mutually engage in a manner that prevents disengagement under stresses of a variety of operating environments such as vibrations, tilting and other movement. In the current example, the battery housing 100 has a main portion 150 that is configured to define a battery cavity and a secondary portion 160 that is configured to define a wiring conduit for wires extending from the battery cavity. In some alternate examples, the battery housing 100 does not define a separate wiring conduit.

Figure 2:
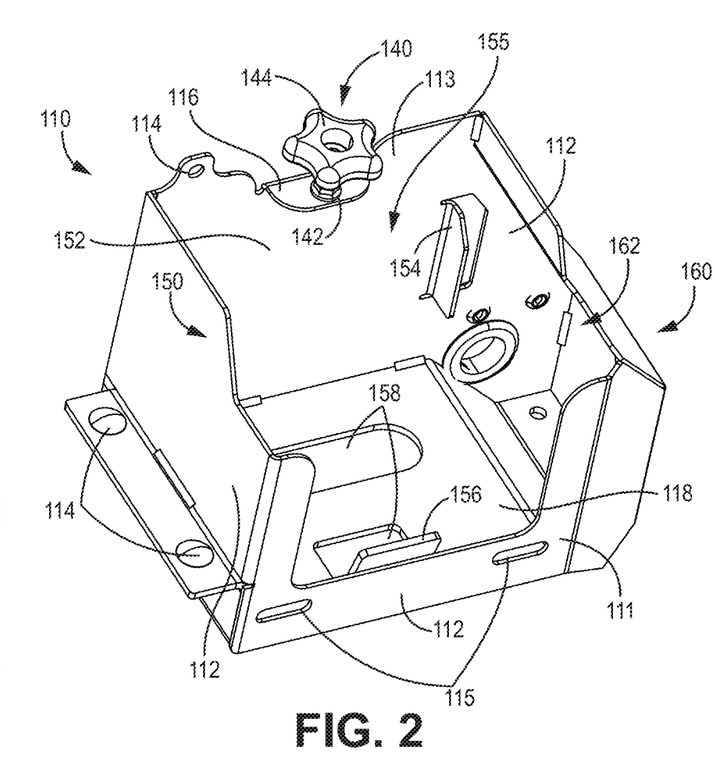
FIG. 2 is an isolated perspective view of a casing of the example of FIG. 1.

The casing 110 is generally configured to receive a battery. FIG. 2 depicts a perspective view of the casing 110 of FIG. 1 without the cover 120 and can be viewed in conjunction with FIG. 1 for the following description. The casing 110 has a plurality of sidewalls 112. The plurality of sidewalls 112 define an installation opening 155 and the battery cavity 152 configured to receive a battery. The installation opening 155 is generally configured to allow insertion and removal of a battery relative to the battery cavity 152. In various embodiments the casing 110 is configured to be coupled to structures of its intended operating environment. As such, the casing 110 defines various coupling features 114 that are configured to be coupled to a system with fasteners generally known in the art. In the current example, the plurality of sidewalls 112 of the casing 110 also defines the secondary portion 160 defining the wiring conduit 162. The wiring conduit 162 is configured to provide a protected route for wires extending from the battery to another location. As such, the wiring conduit 162 generally extends outward from the battery cavity 152. The plurality of sidewalls 112 can include a battery platform 118 that is configured to support a battery within the battery housing 100.

Figure 3:
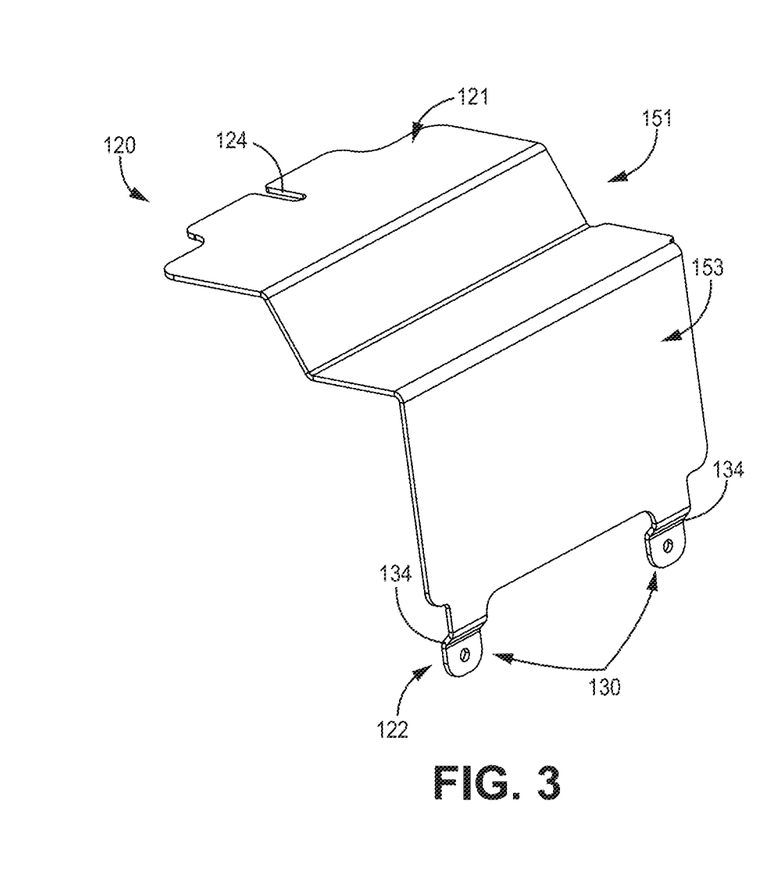
FIG. 3 is an isolated perspective view of a cover of the example of FIG. 1.

The cover 120 is selectively coupled to the casing 110. The cover 120 is generally configured to provide protection across the battery cavity but provide access to the battery cavity and the installation opening for installation and removal of a battery in the battery housing 100. FIG. 3 is a perspective view of the example cover 120 of FIG. 1 without the casing 110 and can be viewed in conjunction with FIGS. 1 and 2. When coupled to the casing 110, the cover 120 extends across the installation opening 155 (FIG. 2). The battery housing 100 is generally designed such that installation of the cover 120 on the casing 110 establishes static forces that help prevent disengagement of the cover 120 and the casing 110 in various operating environments.

Figure 4A:
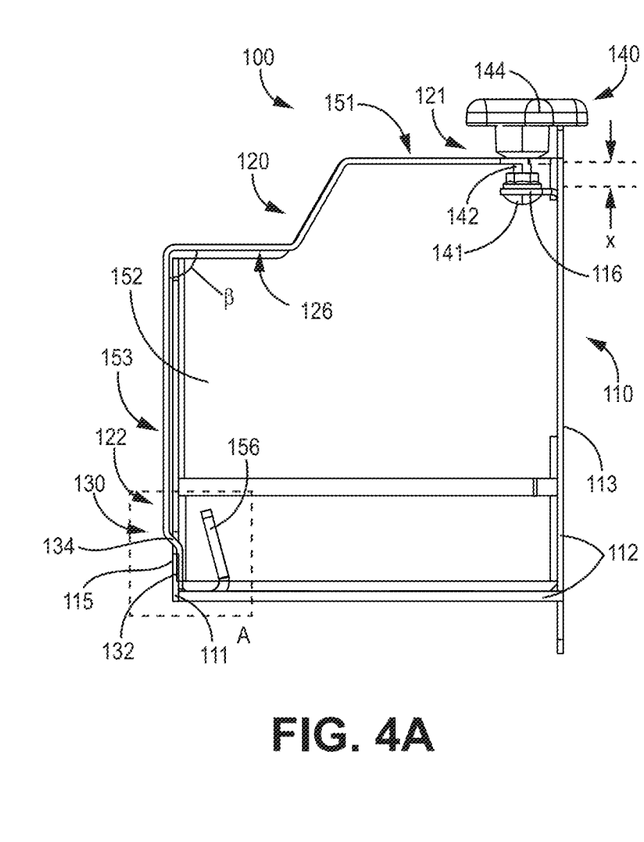
FIG. 4A is a cross-sectional view of the example battery housing of FIG. 1.
Figure 4B:
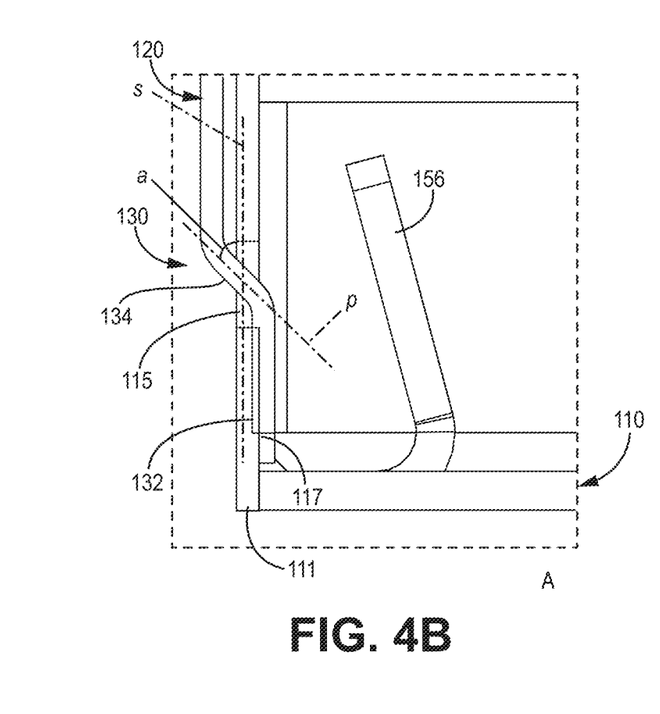
FIG. 4B is detail view A of FIG. 4A.

The cover 120 generally has a first end 121 and a second end 122. The cover 120 is removably coupled to the casing towards the first end 121. The cover 120 is removably coupled to the casing towards the second end 122. With respect to the second end, the second end 122 of the cover 120 has an engagement tab 130. The engagement tab 130 is configured to removably extend through a tab receptacle 115 of the casing 110. FIG. 4A is a first cross-sectional view of the battery housing of FIG. 1 through the engagement tab and FIG. 4B is a detail view of feature A in FIG. 4A, where the engagement tab 130 and a corresponding tab receptacle 115 are particularly visible. The engagement tab 130 is configured to extend from outside the casing 110 towards the battery cavity 152. The engagement tab 130 generally defines an engagement surface 132 that is configured to frictionally engage a mating surface 117 of the casing 110. The engagement surface 132 can be an outer surface of the engagement tab 130 and the mating surface 117 of the casing 110 can be an inner surface of the casing 110.

More particularly, a first sidewall 111 of the plurality of sidewalls 112 of the casing 110 is configured to frictionally engage the engagement tab 130 of the cover 120. In particular, in the current example, the first sidewall 111 defines the tab receptacle 115 extending therethrough. The tab receptacle 115 is generally configured to allow the engagement tab 130 of the cover 120 to extend from outside the casing 110 to inside the casing 110. Upon insertion of the engagement tab 130 through the tab receptacle 115, the engagement surface 132 of the engagement tab 130 abuts the inner surface of the first sidewall 111. In a variety of embodiments, the engagement surface 132 and the mating surface 117 of the casing 110 are substantially parallel. Such a configuration can advantageously maximize the frictional force between the two surfaces. Such a configuration can reduce the ability of engagement tab 130 and the first sidewall 111 to separate.

In embodiments consistent with the current example, each engagement tab 130 of the plurality of engagement tabs is removably disposed in a tab receptacle 115. Each engagement tab 130 has an extension portion 134 that angles inwardly towards the battery cavity 152. The extension portion 134 is configured to extend through the tab receptacle 115. The extension portion 134 generally defines a tab plane p that is between 0° and 90° to a sidewall plane s defined by the first sidewall 111. In some embodiments the tab plane p of the extension portion 134 is between 15° and 80° relative to the sidewall plane s.

In various embodiments the extension portion 134 has a length that facilitates frictional contact between the engagement surface 132 and the mating surface 117. Embodiments consistent with the current example can be implemented in battery housings that are particularly rigid, such as housings constructed of a relatively stiff sheet metal such as steel that has limited flexibility in response to manual manipulation. In some other embodiments where one of the engagement tab 130 or the first sidewall 111 is has greater elastic flexibility, the engagement tab 130 can be planar. In such embodiments, the engagement tab and/or the first sidewall can elastically flex to accommodate insertion of the tab through the tab receptacle, and elastic forces opposing such flexing can create frictional engagement between the engagement surface 132 and the mating surface 117 of the first sidewall.

In the current example, the first sidewall 111 defines two tab receptacles 115 and the cover 120 has two engagement tabs 130, but in some examples a single tab receptacle and corresponding engagement tab can be employed. In yet other embodiments additional tab receptacles (and corresponding engagement tabs) can be defined. In the current example, the tab receptacle 115 is a discrete opening defined in the first sidewall 111, but in some other embodiments the tab receptacle 115 can be integral to the installation opening 155. Furthermore, while the engagement tab 130 is a component extending outward from the cover 120, in some other examples the engagement tab is integral with the second end 122 of the cover 120 such that the engagement tab is not a distinct component. In embodiments consistent with the current example, each engagement tab 130 of the plurality of engagement tabs is removably disposed in a corresponding tab receptacle 115.

The cover 120 is removably coupled to the casing 110 towards the first end 121 of the cover 120. More particularly, the battery housing 100 has an adjustable compression mechanism 140 coupling the first end 121 of the cover 120 to the casing 110. The adjustable compression mechanism 140 is generally configured to allow a user to adjust the static forces between the casing 110 and the first end 121 of the cover 120. In various embodiments, the adjustable compression mechanism 140 defines an axial distance x between the first end 121 of the cover 120 and the casing 110, particularly visible in FIG. 4C, which is a cross-sectional detail view through the adjustable compression mechanism 140. The adjustable compression mechanism 140 is configured to adjustably compress the first end 121 of the cover 120 and the casing 110 together across the axial distance x.

In the current example, the adjustable compression mechanism 140 has a bolt 142 having a first bolt end 141 fixed to the casing 110. In particular, a second sidewall 113 of the plurality of sidewalls 112 has a bolt flange 116 (see FIG. 2) that is fixed to the first bolt end 141. The bolt flange 116 extends inwardly from the second sidewall 113. The first end 121 of the cover 120 is axially translatable along the bolt 142. In particular, the cover 120 defines a bolt receiving slot 124 (FIG. 3) extending from a distal end of the first end 121 of the cover 120 towards the second end 122 of the cover 120. As such, when installing the cover 120 onto the casing 110, a user can manually slide the bolt 142 into the bolt receiving slot 124. Such a configuration advantageously allows the cover 120 and the casing 110 to be assembled without detachment of the adjustable compression mechanism 140 from the housing 100. Furthermore, the slot 124 advantageously prevents the cover 120 from exerting a transverse force on the bolt 142 (either to the left or the right relative to FIG. 4A), which allows the adjustable compression mechanism 140 to maintain a particular orientation. In this example, the bolt 142 has a vertical orientation.

Figure 4C:
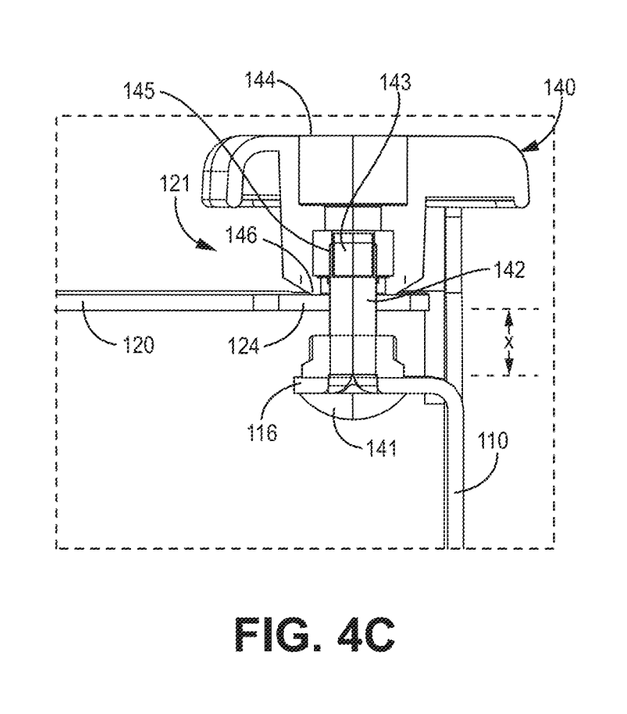
FIG. 4C is an example cross-sectional view consistent with embodiments herein.

In the current example, the adjustable compression mechanism 140 has a knob 144 coupled to a second bolt end 143 of the bolt 142. The knob 144 is generally configured for manual rotation by a user to adjust the compression force exerted by the adjustable compression mechanism 140 on the casing 110 and cover 120. The bolt end 142 extends through the bolt receiving slot 124 and the knob 144 engages the second bolt end 143. More particularly, the knob 144 defines an inner threaded receptacle 145 that adjustably engages the second bolt end 143. As the knob 144 is rotated relative to the second bolt end, the knob 144 axially translates along the bolt 142. Compression force is exerted by the adjustable compression mechanism 140 on the first end 121 of the cover 120 (particularly by a leading face 146 of the knob 144) and the bolt flange 116 (particularly by a bolt head defining the first bolt end 141) in a direction towards each other, which results in tension between the inner threaded receptacle 145 and the second bolt end 143. Such tension reduces the opportunity for the connection between the cover 120 and the casing 110 to loosen over time, even in environments subject to vibration and other motion.

As is visible in FIGS. 1 and 4A, in the current example, the first end 121 of the cover 120 forms a top cover portion 151 across the battery cavity 152. Furthermore, in the current example, the cover 120 forms a side cover portion 153 extending from the top cover portion 151 to the engagement tab(s) 130. However, in some other embodiments, the cover 120 can form two side cover portions of the battery housing 100 (rather than, for example, a side cover portion and a top cover portion). In the current example, the top cover portion 151 and the side cover portion 153 form a corner angle of at least 45° (see FIG. 4A). More particularly, in the current example, the top cover portion 151 and the side cover portion 153 form a corner angle of about 90°. In some embodiments, the top cover portion 151 and the side cover portion 153 form a corner angle β ranging from 45° to 135°, 60° to 120°, or 70° to 110°. In some embodiments, the cover 120 is configured to elastically deform at the corner during installation of the cover 120 on the casing 110, which can introduce a moment arm that can relatively increase (1) the frictional force between the engagement surface 132 and the mating surface 117 of the first sidewall 111 and (2) the tension across the bolt 142 and knob 144.

Figure 5:
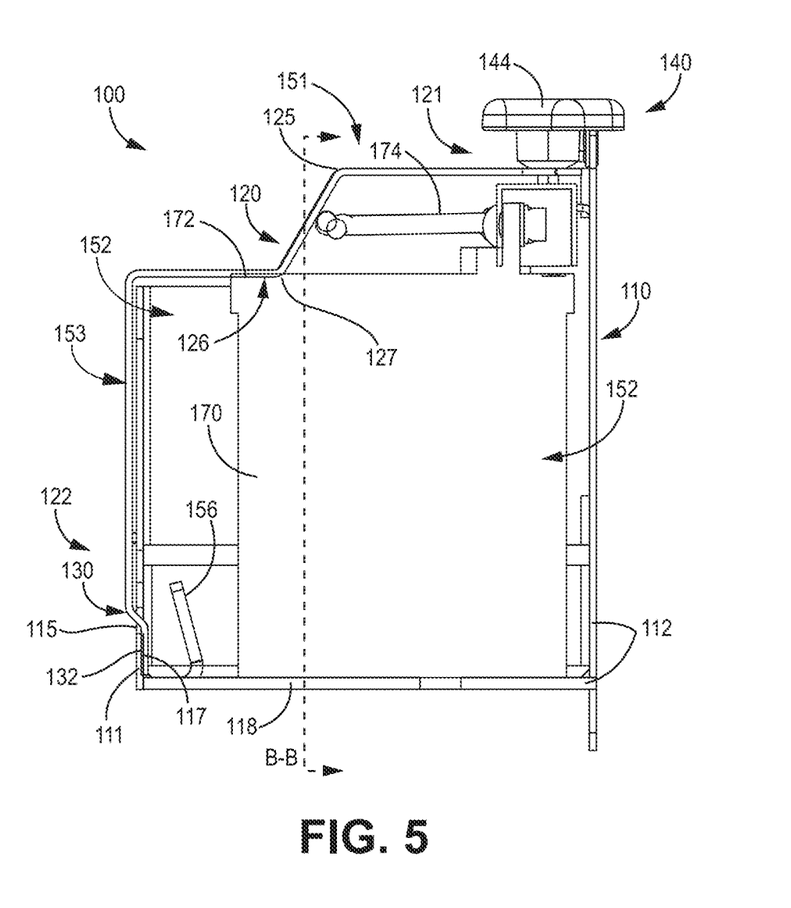
FIG. 5 is a first cross-sectional view of an example implementation of the battery housing of FIG. 1.

In some embodiments the cover 120 has a battery compression surface 126 that is configured to provide downward pressure on a battery that is installed in the battery cavity 152 of the battery housing 100. The battery compression surface 126 is generally defined between the first end 121 and the second end 122 of the cover 120. FIG. 5 depicts a first cross-sectional view of an example implementation of the battery housing 100 of FIGS. 1-4C where a battery 170 is installed in the battery housing 100. The battery 170 is supported by the battery platform 118, which forms a base of the battery housing 100. The top surface 172 of the battery 170 is configured to abut the battery compression surface 126. As such, the battery compression surface 126 defines a boundary of the battery cavity 152. More particularly, the battery compression surface 126 defines an upper boundary of the battery cavity 152, but in some other embodiments the battery compression surface can define a side boundary of the battery cavity.

Upon installation of a battery 170 and the cover 120, the battery compression surface 126 of the cover 120 is configured to exert downward pressure on the top surface 172 of the battery. The upward force of the battery 170 on the cover 120 can create a moment arm opposing insertion of the engagement tab 130 through the tab receptacle 115, which can advantageously increase the frictional force between the engagement surface 132 and the mating surface 117 of the first sidewall 111. The upward force of the battery 170 on the cover 120 can result in an upward force against the knob 144, which can increase tension across the adjustable compression mechanism 140.

In the current example, the cover 120 is double bent to define the battery compression surface 126. In particular, from the first end 121 to the second end 122 of the cover 120, the cover 120 has a first bend 125 that slopes the cover 120 to a position abutting the battery cavity 152. A second bend 127 extends the cover 120 parallel to the upper boundary of the battery cavity 152 to the corner angle β.

In some embodiments a resilient member can be coupled to the cover 120 to define the battery compression surface 126. The resilient member can be constructed of a compressible material such as a polymeric foam, rubber, or the like, that can advantageously increase and/or distribute compressive forces over the top surface 172 of the battery 170.

Figure 6:
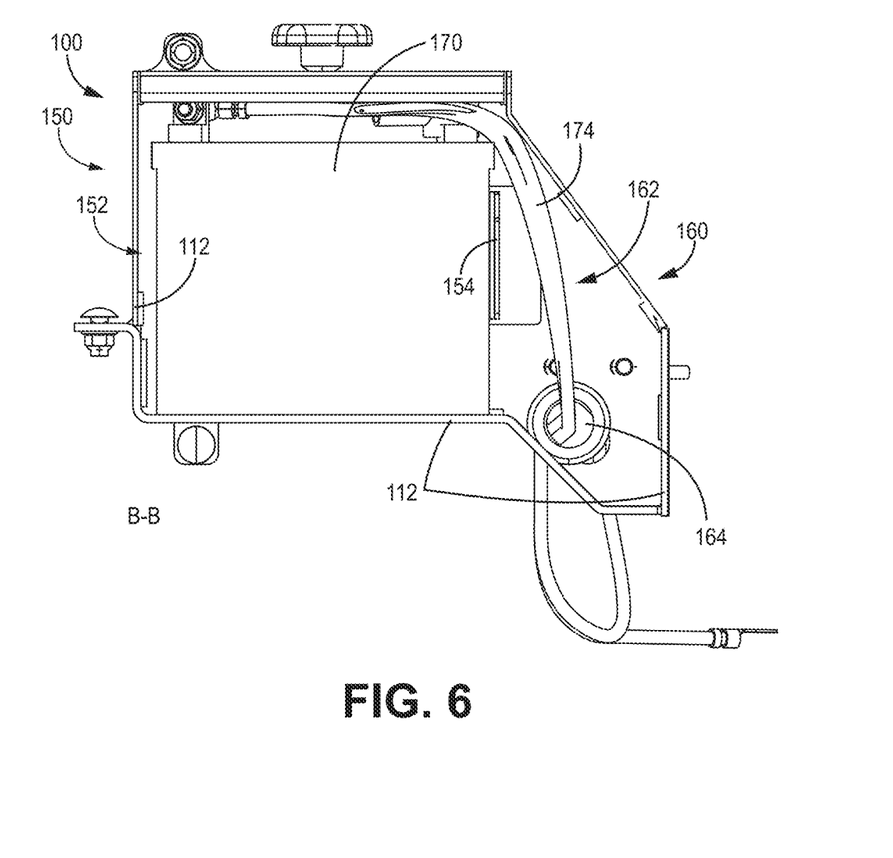
FIG. 6 is a second cross-sectional view of the example implementation of the battery housing of FIG. 1.

The battery housing 100 can have a variety of different configurations but is generally configured to contain a battery 170. In examples consistent with the embodiments depicted herein, the casing 110 of the battery housing 100 also defines the secondary portion 160 that defines the wiring conduit 162 (see FIG. 1, for example). In some embodiments, the cover 120 defines a portion of the wiring conduit 162. The wiring conduit 162 generally forms a protective housing for a length of the wiring extending from the battery 170 to system components. In the current example, the sidewalls 112 defining the wiring conduit 162 generally slope outward and downward from the battery cavity 152. FIG. 6 is a second cross-sectional view of the example implementation depicted in FIG. 5 through plane B-B, which provides a facing view of the example wiring conduit 162.

The wiring conduit 162 extends from the battery cavity 152 to a conduit outlet 164 defined by an opening in a sidewall of the plurality of sidewalls 112. As such, wires 174 coupled to the battery 170 pass from the battery cavity 152 through the wiring conduit 162 to the conduit outlet 164. In various example implementations, the conduit outlet 164 is configured to align with a system wiring inlet for a system within which the currently described battery housing is implemented. For example, the system wiring inlet can be an opening through a vehicle frame, in some implementations.

In various embodiments, the battery housing 100 is configured to limit shifting of the battery 170 within the battery housing 100. Such a configuration can be advantageous in implementations relevant to vehicles, for example, where the battery housing 100 can be at different orientations and may experience changes in speed and momentum. Such a configuration can also be advantageous where portions of the battery housing 100 are allocated for purposes other than housing and retaining the battery 170 such as, for example, the wiring conduit 162. As is visible in FIGS. 2 and 6, the battery housing 100 has a first restraint flange 154 extending inwardly from a sidewall 112. The first restraint flange 154 is generally configured to separate the battery cavity 152 from the wiring conduit 162. Furthermore, the first restraint flange 154 is configured to prevent translation of the battery 170 into the wiring conduit 162 portion of the battery housing 100.

In the current example, the first restraint flange 154 is formed from a cut-out portion of a sidewall (here, the second sidewall 113) that is bent to form a side border of the battery cavity 152. While in the current example the first restraint flange 154 is generally perpendicular relative to the second sidewall 113, in some embodiments the first restraint flange 154 can be inclined relative to the second sidewall 113. Furthermore, while in the current example the first restraint flange 154 is generally perpendicular relative to the battery platform 118, in some embodiments the first restraint flange 154 can be inclined relative to the battery platform 118.

In various embodiments the battery housing 100 also has a second restraint flange 156 extending inwardly from a sidewall of the plurality of sidewalls 112, which is visible in FIGS. 2, 4A, 4B and 5. In this example, the second restraint flange 156 is generally configured to separate the battery cavity 152 from the first sidewall 111. More particularly, in this example the second restraint flange 156 is configured to provide a physical obstruction between the battery 170 disposed in the battery cavity 152 and each of the engagement tab 130, the tab receptacle 115, and the mating surface 117 of the first sidewall 111.

In the current example, the second restraint flange 156 extends upward from the battery platform 118. In some embodiments the second restraint flange 156 is generally perpendicular to the battery platform 118 however, in the current example, the second restraint flange 156 is angled towards the first sidewall 111. Such a configuration can advantageously facilitate gravity-assisted installation of a battery 170 in the battery cavity 152. When the battery 170 is being inserted into the battery housing 100, the second restraint flange 156 can guide the battery 170 towards the battery cavity 152 and away from the first sidewall 111. In the current example, the second restraint flange 156 is formed from a cut-out portion of a sidewall (here, the battery platform 118) that is bent to form a side border of the battery cavity 152.

It is noted that in examples consistent with the currently depicted embodiments, the battery platform 118 defines an access opening 158 (visible in FIG. 2) to a bottom surface of a battery 170 received by the battery platform 118. In some embodiments, the opening resulting from cutting and bending the second restraint flange 156 away from the battery platform 118 can also form an access opening 158. The access opening(s) 158 are generally configured to accommodate the hand of a user for manual removal of a battery 170 from the battery cavity 152. In particular, a user can access the bottom of the battery 170 through the access opening(s) 158 to manually push the battery 170 upwards from the battery platform 118.

Figure 7:
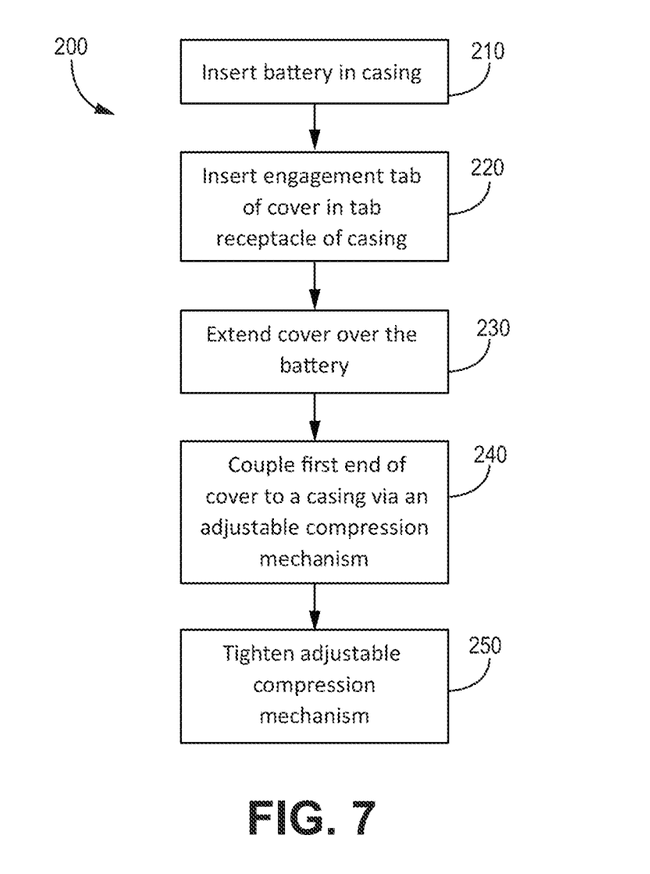
FIG. 7 is an example flow chart consistent with methods described herein.

FIG. 7 depicts a flow chart of an example method 200 of installing a battery consistent with various embodiments. A battery is inserted in a casing 210. An engagement tab of a cover is inserted in a tab receptacle of the casing 220. The cover is extended over the battery 230. A first end of the cover is coupled to the casing via an adjustable compression mechanism 240. The adjustable compression mechanism is tightened 250.

The battery is inserted in a casing 210 through an installation opening in the casing to a battery cavity. In various embodiments, the battery is placed on a battery platform within various sidewalls and restraining features that help define the battery cavity, where such features have been described above. In various embodiments, wires that are configured to extend from the battery to system components are coupled to the battery before or after insertion of the battery in the casing 210.

An engagement tab of a cover is inserted in a tab receptacle of the casing 220. The engagement tab of the cover can be defined towards a second end of the cover, as has been described above. In various embodiments a plurality of engagement tabs are each inserted in a corresponding tab receptacle of the casing 220. The engagement tabs and tab receptacles can have configurations that have been described above.

In various embodiments, extending the cover over the battery 230 also extends the cover over the installation opening and the battery cavity. The cover can be extended over the battery 230 simultaneously with inserting the engagement tab of the cover in the tab receptacle of the casing 220.

Coupling the first end of the cover to the casing via an adjustable compression mechanism 240 can include coupling the first end of the cover to the adjustable compression mechanism that is fixed to the casing. For example, the first end of the cover can be slid past a bolt (which defines a portion of the adjustable compression mechanism) to translate the bolt along a slot defined by the first end of the cover. The first end of the cover can be coupled to the casing 240 before or after inserting the engagement tab in the tab receptacle 220. In some embodiments, extending the cover over the battery 230 is executed after the first end of the cover is coupled to the casing via the adjustable compression mechanism 240.

Tightening the adjustable compression mechanism 250 can translate the first end of the cover axially towards the casing, which has been discussed above. Furthermore, tightening the adjustable compression mechanism 250 can compress the first end of the cover towards the casing, which can result in tension across the adjustable compression mechanism. In various examples, tightening the adjustable compression mechanism 250 results in the cover applying a compression force to the battery. The compression force on the battery can reduce the ability of the battery to shift within the battery cavity during system operation. The adjustable compression mechanism can be tightened 250 by rotating a manually rotatable knob, for example, which has been discussed above.

Figure 8:
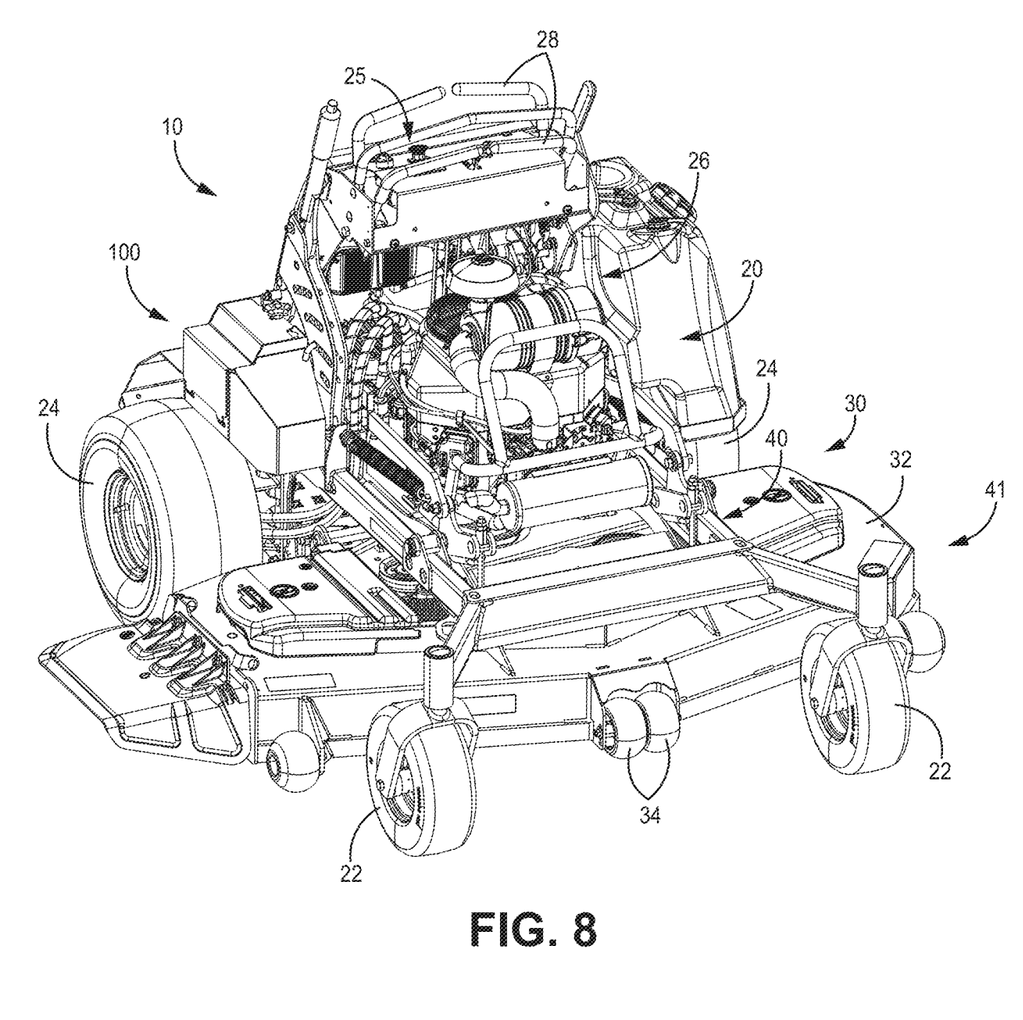
FIG. 8 is a perspective view of an example implementation of a battery housing consistent with the technology disclosed herein in an example maintenance vehicle.

FIG. 8 depicts a specific example implementation of battery housings consistent with the technology disclosed herein. In the current example, a battery housing 100 is implemented in an example grounds maintenance vehicle 10, which can simply be referred to as a "vehicle". The vehicle 10, in the current example, is a standing lawn mower. While embodiments are described herein with respect to such a mower, this disclosure is equally applicable to mowers having alternate configurations (e.g., walk-behind mowers and riding mowers). The embodiments also apply to other types of grounds maintenance vehicles (e.g., aerators, dethatchers, debris management systems, blowers, vacuums, sweepers, general purpose utility vehicles, etc.) without limitation.

The vehicle 10 has a first portion that is an implement assembly 30 and a second portion that is a drive assembly 20. A vehicle frame assembly 40 is generally configured to support the drive assembly 20, the implement assembly 30, and other components of the vehicle 10. The vehicle frame assembly 40 also supports the battery housing 100. In particular, the battery housing 100 is coupled to the vehicle frame assembly 40 via coupling features 114 (see FIG. 2, for example).

Ground engaging members 22 are disposed between the vehicle frame assembly 40 the ground. The ground engaging members 22 are generally configured to accommodate translation of the vehicle frame assembly 40 across the ground. In the current example, the ground engaging members 22 are wheels that are rotatably coupled to the vehicle frame assembly 40. More particularly, the ground engaging members 22 are caster wheels that rotate (for rolling) and swivel (for turning) and are coupled to a front end 41 of the vehicle frame assembly 40. In some embodiments, the ground engaging members can be alternate structures or components other than caster wheels such as tracks, rollers, or drive wheels.

The drive assembly 20 is supported by the vehicle frame assembly 40. The drive assembly 20 is generally configured to propel the vehicle 10 for use. The drive assembly 20 of the grounds maintenance vehicle 10 can have drive wheels 24 and a prime mover 26 (e.g., internal combustion engine or electric motor) that are configured to selectively propel the vehicle 10 across the ground. The drive assembly 20 can have handles 28 by which the vehicle 10 is directed and controlled by an operator. The drive assembly 20 can also have various controls 25 that can be manipulated by the operator to adjust various operating conditions.

The implement assembly 30 is generally configured to couple to, or be integrally formed with, a grounds maintenance vehicle. The implement assembly 30 is generally configured to perform a maintenance task on a surface, such as the ground. The implement assembly 30 has an implement 32 generally configured for operational interaction with the ground. In the current example, the implement 32 is configured to be disposed between at least a portion of the vehicle frame assembly 40 and the ground.

In the current example, where the vehicle 10 has an implement assembly 30 that is a lawn mower assembly, the implement 32 is a cutting deck having a housing and defining a cutting chamber. Cutting blades are rotatably disposed in the cutting chamber. Other cutting decks (e.g., belly-mounted decks, towed decks, reel units, etc.), as well as other implements, are contemplated within the scope of this disclosure. During operation, power is selectively delivered to the cutting blades by the engine, whereby the blades rotate at a speed sufficient to sever grass and other vegetation over which the deck passes.

The implement 32 can have a plurality of rollers 34 (e.g., anti-scalp rollers) configured to be disposed between the implement 32 and a ground to limit contact between the implement 32 and the ground. The plurality of rollers 34 can be configured to obstruct contact between the implement 32 and the ground to reduce scalping of the ground as the implement 32 translates across the ground.

It should also be noted that, as used in this specification and the appended claims, the phrase "configured" describes a system, apparatus, or other structure that is constructed to perform a particular task or adopt a particular configuration. The word "configured" can be used interchangeably with similar words such as "arranged", "constructed", "manufactured", and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference. In the event that any inconsistency exists between the disclosure of the present application and the disclosure(s) of any document incorporated herein by reference, the disclosure of the present application shall govern.

This application is intended to cover adaptations or variations of the present subject matter. It is to be understood that the above description is intended to be illustrative, and not restrictive, and the claims are not limited to the illustrative embodiments as set forth herein.

What is claimed is:

1. A battery housing comprising:
 a casing comprising a plurality of sidewalls defining an installation opening and a battery cavity configured to receive a battery, the plurality of sidewalls comprising a first sidewall having a tab receptacle extending therethrough;
 a cover extending across the installation opening, the cover comprising a first end, a second end, and an engagement tab towards the second end, wherein the engagement tab is configured to removably extend through the tab receptacle from outside the casing towards the battery cavity, the engagement tab defining an engagement surface that is configured to frictionally engage the first sidewall in the battery cavity; and
 an adjustable compression mechanism coupling the first end of the cover to the casing, wherein the adjustable compression mechanism defines an axial distance between the casing and the cover, and wherein the adjustable compression mechanism is configured to adjustably compress the cover and the casing together across the axial distance.

2. The battery housing of claim 1, wherein the first end forms a top cover portion of the battery housing.

3. The battery housing of claim 2, wherein the cover further forms a side cover portion extending from the top cover portion to the engagement tab.

4. The battery housing of claim 3, wherein the side cover portion and the top cover portion form an angle of at least 45°.

5. The battery housing of claim 1, wherein the cover is separable from the plurality of sidewalls.

6. The battery housing of claim 1, the cover further comprising a battery compression surface between the first end and the second end, wherein the battery compression surface is configured to apply downward pressure to a battery disposed in the battery cavity.

7. The battery housing of claim 1, the adjustable compression mechanism comprising a bolt having a first bolt end fixed to the casing and the first end of the cover is axially translatable along the bolt.

8. The battery housing of claim 7, wherein the adjustable compression mechanism further comprises a knob coupled to a second bolt end of the bolt configured for manual rotation by a user.

9. The battery housing of claim 1, wherein the cover defines a bolt receiving slot extending from a distal end of the first end of the cover towards the second end of the cover.

10. The battery housing of claim 1, wherein the engagement tab has an extension portion defining a tab plane is between 0° and 90° to a sidewall plane defined by the first sidewall.

11. The battery housing of claim 1, wherein the cover comprises a plurality of engagement tabs defining the engagement surface and the first sidewall defines a plurality of tab receptacles, wherein each engagement tab of the plurality of engagement tabs is removably disposed in a tab receptacle.

12. The battery housing of claim 1, wherein the casing further comprises a wiring conduit extending outward from the battery cavity.

13. The battery housing of claim 12, further comprising a first restraint flange extending inward from a sidewall, wherein the first restraint flange separates the battery cavity from the wiring conduit.

14. The battery housing of claim 1, further comprising a restraint flange extending inward from a sidewall, wherein the restraint flange separates the battery cavity from the first sidewall.

15. The battery housing of claim 14, wherein the plurality of sidewalls comprises a battery platform, wherein the restraint flange extends upward from the battery platform and towards the first sidewall.

16. The battery housing of claim 1, wherein the plurality of sidewalls comprises a battery platform, wherein the battery platform defines an access opening to a bottom surface of a battery received by the battery platform.

17. A method of installing a battery in a battery housing comprising:
   inserting a battery through an installation opening in a casing into a battery cavity;
   inserting an engagement tab of a cover into a tab receptacle of the casing, wherein the engagement tab is defined towards a second end of the cover;
   extending the cover over the battery and the installation opening;
   coupling a first end of the cover to an adjustable compression mechanism fixed to the casing; and
   tightening the adjustable compression mechanism to translate the first end of the cover axially towards the casing.

18. The method of claim 17, wherein the adjustable compression mechanism comprises a bolt and coupling the first end of the cover to the adjustable compression mechanism comprises sliding the first end of the cover past the bolt to translate the bolt along a slot defined by the first end of the cover.

19. The method of claim 18, wherein tightening the adjustable compression mechanism results in the cover applying compression force to the battery.

20. The method of claim 17, wherein tightening the adjustable compression mechanism comprises rotating a manually rotatable knob.

* * * * *